US012594939B2

(12) United States Patent
Wang et al.

(10) Patent No.: US 12,594,939 B2
(45) Date of Patent: Apr. 7, 2026

(54) VEHICLE CONTROL APPARATUS AND METHOD, AND STORAGE MEDIUM

(71) Applicant: SHENZHEN YINWANG INTELLIGENT TECHNOLOGIES CO., LTD., Shenzhen (CN)

(72) Inventors: Hui Wang, Shenzhen (CN); Jian Sun, Shanghai (CN); Tianzhu Song, Shanghai (CN); Lulu Yang, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 49 days.

(21) Appl. No.: 18/661,015

(22) Filed: May 10, 2024

(65) Prior Publication Data

US 2024/0294168 A1     Sep. 5, 2024

Related U.S. Application Data

(63) Continuation of application No. PCT/CN2021/130416, filed on Nov. 12, 2021.

(51) Int. Cl.
 *B60W 30/18* (2012.01)
 *B60W 10/18* (2012.01)

(52) U.S. Cl.
 CPC ...... *B60W 30/18109* (2013.01); *B60W 10/18* (2013.01); *B60W 2420/00* (2013.01);
   (Continued)

(58) Field of Classification Search
 CPC ... B60T 7/042; B60T 7/04; B60T 7/12; B60T 11/103; B60W 10/06; B60W 10/18;
   (Continued)

(56) References Cited

U.S. PATENT DOCUMENTS 2,113,974 A * 4/1938 Arkley ................. B60W 10/04
                                                   74/478
2,244,116 A * 6/1941 Polonec ............... B60W 10/18
                                                   477/213
   (Continued)

FOREIGN PATENT DOCUMENTS

CN       104709086 A     6/2015
CN       105799683 A     7/2016
   (Continued)

OTHER PUBLICATIONS

Extended European Search Report in European Appln. No. 21963643. 8, mailed on Dec. 10, 2021, 11 pages.
   (Continued)

*Primary Examiner* — George C Jin
(74) *Attorney, Agent, or Firm* — Fish & Richardson P.C.

(57) ABSTRACT

Example vehicle control apparatus and methods are described. In one example, the vehicle control apparatus includes a brake pedal and an accelerator pedal. The brake pedal is connected to a vehicle chassis by using a kinematic pair, and at least a part of the accelerator pedal is projected on the brake pedal. Based on the apparatus provided in this application, a driver can complete switching between vehicle braking and vehicle acceleration without moving a same foot.

10 Claims, 7 Drawing Sheets

Obtain a first horizontal displacement value detected by using a first displacement sensor on a brake pedal and a first pressure value detected by using a first pressure sensor

S1

Control, based on the first horizontal displacement value and the first pressure value, a vehicle to brake

S2

(52) U.S. Cl.
CPC ..... *B60W 2520/10* (2013.01); *B60W 2540/10* (2013.01); *B60W 2540/12* (2013.01)

(58) Field of Classification Search
CPC ..... B60W 30/18181; B60W 30/18109; B60W 2420/10; B60W 2540/10; B60W 2540/12; G05G 1/30; G05G 1/305; G05G 1/38; G05G 1/445
See application file for complete search history.

(56) References Cited

U.S. PATENT DOCUMENTS

| | | | | |
|---|---|---|---|---|
| 2,411,167 | A | * | 11/1946 | Nelson ................... B60W 10/04 |
| | | | | 477/212 |
| 2004/0036349 | A1 | * | 2/2004 | Lin ........................... B60T 7/02 |
| | | | | 303/15 |
| 2019/0050655 | A1 | * | 2/2019 | Pohl ........................... G06T 7/20 |

FOREIGN PATENT DOCUMENTS

| | | | | |
|---|---|---|---|---|
| CN | 108454435 | A | | 8/2018 |
| DE | 10118436 | A1 | | 10/2002 |
| DE | 10148281 | A1 | * 1/2003 | ...... B60W 30/18181 |

OTHER PUBLICATIONS

International Search Report and Written Opinion in International Appln. No. PCT/CN2021/130416, mailed on Aug. 11, 2022, 19 pages (with English translation).

* cited by examiner

VEHICLE CONTROL APPARATUS AND METHOD, AND STORAGE MEDIUM

CROSS-REFERENCE TO RELATED APPLICATIONS

This application is a continuation of International Application No. PCT/CN2021/130416, filed on Nov. 12, 2021, the disclosure of which is hereby incorporated by reference in its entirety.

TECHNICAL FIELD

This application relates to the automobile field, and in particular, to a vehicle control apparatus and method, and a storage medium.

BACKGROUND

Currently, an accelerator pedal and a brake pedal in a vehicle are separated mechanisms, and opening degree changes of the corresponding pedals are collected to sense an acceleration intention and a braking intention of a driver. In a most common operation process of switching from an acceleration state to a braking state, a foot action of the driver can be divided into three actions: lifting, turning, and pressing, to be specific, releasing the accelerator pedal, turning a right foot, and depressing the brake pedal. In this process, the "turning" action is a process caused by a current structure model in which the accelerator pedal and the brake pedal are separated from each other. The process increases a reaction distance in a braking process, actually increases a braking distance of the vehicle, and increases a safety risk in an emergency.

SUMMARY

This application provides a vehicle control apparatus and method, and a storage medium. Based on the vehicle control apparatus, a driver can perform a switching operation between acceleration control and braking control without moving a foot.

According to a first aspect, an embodiment of this application provides a vehicle control apparatus, including a brake pedal, an accelerator pedal, a first pressure sensor, and a first displacement sensor. The brake pedal is connected to a vehicle chassis by using a kinematic pair, at least a part of the accelerator pedal is projected on the brake pedal, and the first displacement sensor and the first pressure sensor are disposed on the brake pedal.

Because the projection of the accelerator pedal is located on the brake pedal, the brake pedal is located below the accelerator pedal. Therefore, a driver may control the brake pedal and the accelerator pedal by using a same foot, and can perform switching from acceleration to braking without moving the foot. This greatly reduces an actual braking distance and reduces a safety risk in an emergency.

In a possible design, a first end of the accelerator pedal is connected to the brake pedal by using a revolute pair, a second end of the accelerator pedal is disposed in a suspended manner, and a vertical distance between the first end of the accelerator pedal and the brake pedal is less than a vertical distance between the second end of the accelerator pedal and the brake pedal. Through the structure, the accelerator pedal and the brake pedal are combined as a whole. This facilitates control of the driver.

In a possible design, a first end of the accelerator pedal is connected to the vehicle chassis by using a revolute pair, a second end of the accelerator pedal is disposed in a suspended manner, and a vertical distance between the first end of the accelerator pedal and the brake pedal is less than a vertical distance between the second end of the accelerator pedal and the brake pedal.

In a possible design, a second end of the accelerator pedal is connected to the vehicle chassis by using a revolute pair, a first end of the accelerator pedal is disposed in a suspended manner, and a vertical distance between the first end of the accelerator pedal and the brake pedal is less than a vertical distance between the second end of the accelerator pedal and the brake pedal.

In a possible design, the accelerator pedal is connected to the vehicle chassis by using a revolute pair, one end of the revolute pair is fastened to a first location of the accelerator pedal, the other end of the revolute pair is fastened to the vehicle chassis, the accelerator pedal is connected to the brake pedal by using a sliding block, the sliding block is sleeved at a second location of the accelerator pedal, and the sliding block is hinged to the brake pedal. In the structure, the accelerator pedal may be linked to the brake pedal, so that in a process of moving the brake pedal, the accelerator pedal automatically restores to an initial location. This ensures effectiveness of a braking process and improves safety in the braking process.

In a possible design, the vehicle control apparatus further includes a second displacement sensor, one end of the second displacement sensor is fastened to a non-pedaled surface of the accelerator pedal, and the other end of the second displacement sensor is fastened to the vehicle chassis or the brake pedal. The second displacement sensor is configured to detect on rotation displacement of the accelerator pedal. A displacement value on the accelerator pedal may be converted into an acceleration value by using the second displacement sensor.

In a possible design, the vehicle control apparatus further includes a second pressure sensor, and the second pressure sensor is disposed on a non-pedaled surface of the accelerator pedal. Validity of an acceleration signal may be determined by using a pressure value detected on the second pressure sensor.

In a possible design, the vehicle control apparatus further includes a first elastic component, one end of the first elastic component is fastened to the vehicle chassis, and the other end is fastened to a first end of the brake pedal. The brake pedal may be automatically reset by using the first elastic component.

In a possible design, the vehicle control apparatus further includes a second elastic component, the second elastic component is disposed on the revolute pair, and the accelerator pedal is reset through rotation by using the second elastic component. The brake pedal may be automatically reset by using the second elastic component.

In a possible design, a second end of the brake pedal is connected to a boost system. A boost is provided for the brake pedal by using the boost system, so that control on the brake pedal is more convenient.

According to a second aspect, an embodiment of this application further provides a vehicle control method, where the method is applied to any one of the foregoing vehicle control apparatuses, and the method includes:

obtaining a first horizontal displacement value detected by using a first displacement sensor on a brake pedal and a first pressure value detected by using a first pressure sensor; and controlling, based on the first horizontal displacement value and the first pressure value, a vehicle to brake.

By using the control apparatus according to the first aspect and based on the foregoing method, the driver may directly control the brake pedal under the foot to move to implement braking, so that the driver can perform a switching operation between acceleration control and braking control without moving the foot. This greatly reduces an actual braking distance of the vehicle and reduces a safety risk in an emergency.

In a possible design, controlling, based on the first horizontal displacement value and the first pressure value, the vehicle to brake or accelerate includes:

determining whether the first pressure value is greater than a first preset pressure value; and if yes, determining braking force based on the first horizontal displacement value, and generating and outputting a first braking signal that includes the braking force; or if no, maintaining a current state of the vehicle.

Based on the foregoing method, validity of the braking signal can be accurately determined by using the pressure value. This improves safety in a braking control process of the vehicle.

In a possible design, the vehicle control method further includes:

obtaining a second pressure value detected by using a second pressure sensor on an accelerator pedal and a second displacement value detected by using a second displacement sensor on the accelerator pedal; and when the second pressure value is within a specified range, and the second displacement value is greater than a preset threshold, generating and outputting an acceleration signal.

In the foregoing manner, an acceleration intention of the driver can be further accurately determined.

In a possible design, after the generating and outputting an acceleration signal, the method further includes:

detecting whether a pressure value currently detected by the first pressure sensor on the brake pedal is less than a second preset pressure value; and if yes, determining that the acceleration signal is invalid; or if no, determining that the acceleration signal is valid.

Based on the foregoing solution, if the driver controls the vehicle to accelerate, but no pressure value is detected on the brake pedal, it indicates that an abnormal foot control of the driver exists. In this case, it is determined that the acceleration signal is invalid. This improves safety in a driving process of the vehicle.

In a possible design, after the generating and outputting an acceleration signal, the method further includes:

when it is detected that a vehicle speed of the vehicle is greater than a specified speed, detecting whether a second braking signal exists; and if the second braking signal exists, controlling, based on the second braking signal, the vehicle to brake; or if the second braking signal does not exist, controlling, based on the acceleration signal, the vehicle to accelerate.

Based on the foregoing solution, when the speed of the vehicle exceeds the specified speed, braking is performed first, so that braking can be implemented based on the braking signal in a timely manner in a driving process of the vehicle. This improves safety in the driving process of the vehicle.

According to a third aspect, an embodiment of this application further provides a vehicle control device, including at least one processor coupled to at least one memory.

The at least one processor is configured to execute a computer program or instructions stored in the at least one memory, to enable the vehicle control device to perform the method according to any one of the second aspect or the possible designs of the second aspect.

According to a fourth aspect, an embodiment of this application further provides a readable storage medium, including a program or instructions. When the program or the instructions are executed, the method according to any one of the second aspect or the possible designs of the second aspect is performed.

According to a fifth aspect, an embodiment of this application further provides a vehicle, including a controller, a power system, a brake system, an accelerator pedal, and a brake pedal.

The power system and the brake system are configured to: receive a control instruction of the controller, and perform acceleration control or braking control based on the received control instruction.

The controller is configured to perform the method according to any one of the second aspect or the possible designs of the second aspect.

These aspects or other aspects of this application are more concise and easier to understand in the following descriptions of embodiments.

DESCRIPTION OF EMBODIMENTS

Figure 1:
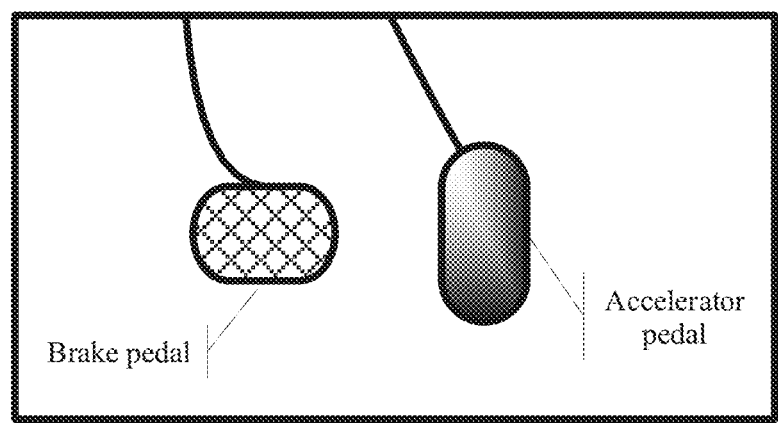
FIG. 1 is a schematic diagram of structures of an accelerator pedal and a brake pedal on a vehicle.

To make the objectives, technical solutions, and advantages of this application clearer, the following further describes this application in detail with reference to the accompanying drawings. A specific operation method in a method embodiment may also be applied to an apparatus embodiment or a system embodiment. It should be noted that in descriptions of this application, "a plurality of" is understood as "at least two". The term "and/or" describes an association relationship between associated objects and indicates that three relationships may exist. For example, A and/or B may indicate the following three cases: Only A exists, both A and B exist, and only B exists. That A is connected to B may indicate two cases: A is directly connected to B, and A is connected to B by using C. In addition, in descriptions of this application, terms such as "first" and "second" are merely used for distinction and description, and should not be understood as an indication or implication of relative importance, or as an indication or implication of an order.

The following further describes technical solutions provided in this application by using embodiments with reference to the accompanying drawings. It should be understood that system structures and service scenarios provided in embodiments of this application are mainly used to explain some possible implementations of the technical solutions of this application, and should not be interpreted as a unique limitation on the technical solutions of this application. A person of ordinary skill in the art may know that, with evolution of a system and emergence of an updated service scenario, the technical solutions provided in this application are also applicable to a same or similar technical problem.

It should be understood that in the technical solutions provided in embodiments of this application, some repeated parts may not be described again in the following descriptions of specific embodiments, but it should be considered that these specific embodiments are mutually referenced and may be combined.

In a conventional fuel vehicle, when a driver needs to change a current vehicle speed of the vehicle, the driver may change an opening degree value of an accelerator pedal to adjust the vehicle speed of the vehicle. When a controller detects that the opening degree value of the accelerator pedal changes, the controller controls an engine to output corresponding torque control, and adjusts a gearbox to adjust a rotational speed and drive wheels to rotate, so that the rotational speed of the vehicle is changed, and a power requirement of the driver is met.

For an electric vehicle, when a driver needs to change a current vehicle speed of the vehicle, the driver may change an opening degree value of an accelerator pedal to adjust the vehicle speed of the vehicle. When a controller detects that the opening degree value of the accelerator pedal changes, the controller controls a motor to output corresponding torque control, so that the motor increases a rotational speed to drive wheels to rotate, and the rotational speed of the vehicle is changed.

Similarly, when the driver needs to decelerate the vehicle, the driver may change an opening degree value of a brake pedal to control the vehicle to decelerate. When the controller detects that the opening degree value of the brake pedal changes, the controller controls a braking apparatus to brake accordingly to reduce the speed of the vehicle.

FIG. 1 shows an accelerator pedal and a brake pedal on a vehicle. In a process in which a driver controls the vehicle to accelerate, if an emergency occurs and the vehicle needs to be braked, the driver needs to move a foot from the accelerator pedal to the brake pedal. In other words, when the driver controls the vehicle to switch from acceleration to braking, a foot action of the driver can be divided into three actions: lifting, turning, and pressing, to be specific, releasing the accelerator pedal, turning a right foot, and depressing the brake pedal. Because of a specific distance between the current accelerator pedal and the brake pedal, the driver needs to turn the foot when implementing the three actions. This increases a reaction distance in a braking process, further increases an actual braking distance, and increases a safety risk in an emergency.

Based on the foregoing problem, this application provides a vehicle control apparatus. The vehicle control apparatus includes a brake pedal and an accelerator pedal. A part of the accelerator pedal is projected on the brake pedal, that is, the brake pedal is located below the accelerator pedal. When a driver drives a vehicle, the driver may simultaneously put a same foot on the accelerator pedal and the brake pedal. Therefore, the driver does not need to move the foot when switching from acceleration control to braking control of the vehicle. This greatly reduces a reaction distance of the driver, reduces an actual braking distance of the vehicle, and reduces a safety risk in an emergency.

The following describes in detail embodiments of this application with reference to the accompanying drawings.

Embodiment 1

Figure 2:
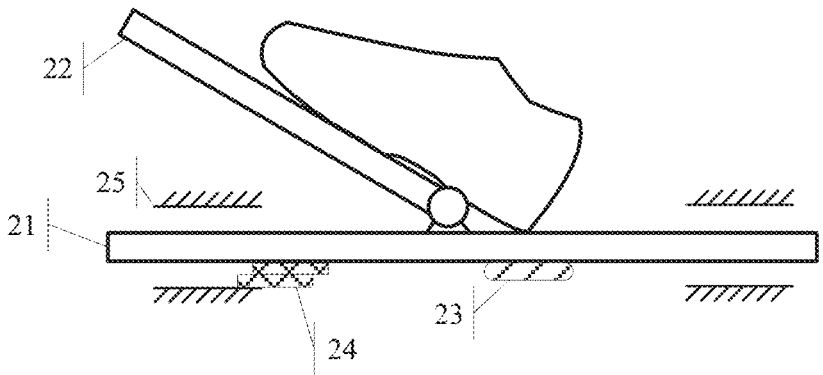
FIG. 2 is a first schematic diagram of a structure of a vehicle control apparatus according to an embodiment of this application.

FIG. 2 is a schematic diagram of a structure of a control apparatus according to an embodiment of this application. The apparatus includes a brake pedal 21, an accelerator pedal 22, a first pressure sensor 23, and a first displacement sensor 24. The brake pedal 21 is connected to a vehicle chassis 25 by using a kinematic pair, and at least a part of the accelerator pedal 22 is projected on the brake pedal 21.

As shown in FIG. 2, a first end of the accelerator pedal 22 is connected to the brake pedal 21 by using a revolute pair, so that the accelerator pedal 22 adjusts an opening degree value by using the revolute pair. A second end of the accelerator pedal 22 is disposed in a suspended manner, and a vertical distance between the first end of the accelerator pedal 22 and the brake pedal 21 is less than a vertical distance between the second end of the accelerator pedal 22 and the brake pedal 21. In other words, the first end of the accelerator pedal 22 is an end close to the brake pedal 21, and the second end of the accelerator pedal 22 is an end away from the brake pedal 21.

In this embodiment of this application, the brake pedal 21 is located between the accelerator pedal 22 and the vehicle chassis 25, and a part of the accelerator pedal 22 is vertically projected on the brake pedal 21. Briefly, the accelerator pedal 22 is located above the brake pedal 21. Through the foregoing structure, a driver may simultaneously put a same foot on the accelerator pedal and the brake pedal, so that the foregoing structure can ensure that the driver controls switching between acceleration and braking without moving the foot.

In addition, in this embodiment of this application, if vertical projection of the accelerator pedal 22 is completely located on the brake pedal 21, the brake pedal 21 is located right below the accelerator pedal 22; or if the vertical projection of the accelerator pedal 22 is partially located on the brake pedal 21, the brake pedal 21 is located diagonally below the accelerator pedal 22. Herein, a relative location relationship between the brake pedal 21 and the accelerator pedal 22 is described merely by using the vertical projection of the accelerator pedal 22, and an absolute location relationship between the two is not limited. In different actual scenarios, the relative location may be adjusted.

It should be noted herein that, because the brake pedal 21 is connected to the vehicle chassis 25 by using the kinematic pair, the brake pedal 21 may move relative to the vehicle chassis 25, and corresponding braking force is determined through detection on a displacement value of the brake pedal 21. Therefore, the first displacement sensor 24 is disposed on the brake pedal 21, and the displacement value of the brake pedal 21 is detected by using the first displacement sensor 24, and then the braking force is determined based on the displacement value. When a vehicle needs to be braked, the driver may control the brake pedal 21 to move to brake the vehicle.

Specifically, as shown in FIG. 2, if the driver pushes the brake pedal 21 in a horizontal direction in FIG. 2, the brake pedal 21 moves in the horizontal direction, and the displacement value of the brake pedal 21 is detected by using the first displacement sensor 24. Because a mapping relationship exists between the displacement value of the brake pedal 21 and the braking force, after the displacement value is detected by using the first displacement sensor 24, the braking force corresponding to the displacement value may be determined based on the mapping relationship, so that braking of the vehicle is controlled based on the braking force. Through the structure shown in FIG. 2, the driver may simultaneously control the brake pedal 21 and the accelerator pedal 22 by using a same foot. Therefore, the driver controls switching between acceleration and braking without moving the foot.

In a possible embodiment, as shown in FIG. 2, the first displacement sensor 24 is disposed on a non-pedaled surface of the brake pedal 21. As shown in FIG. 2, a surface that is of the brake pedal 21 and that is in contact with a foot of the driver is a pedaled surface, and a surface that is not in contact with a foot of the driver is the non-pedaled surface. The first displacement sensor 24 may be disposed at any location on the non-pedaled surface of the brake pedal 21, and is not limited to being disposed at the location shown in FIG. 2.

In addition, the first displacement sensor 24 is divided into a first part and a second part. The first part is fastened to the vehicle chassis 25, and the second part is fastened to the brake pedal 21. When the brake pedal 21 moves, the second part of the first displacement sensor 24 moves relative to the first part, and the displacement value of the brake pedal 21 is detected through relative movement between the first part and the second part.

Further, in a possible embodiment, to accurately respond to a braking operation performed by the driver on the vehicle, in this application, whether the driver has a braking requirement is determined through pressure detection. Specifically, a pressure value may be detected by using the first pressure sensor 23 disposed on the brake pedal 21, and a pressure threshold is set in a controller. If it is detected that the pressure value is greater than the pressure threshold, it is determined that a braking signal is valid. That is, when it is detected that the pressure value is greater than the pressure threshold, braking is implemented based on the braking force corresponding to the displacement value.

It should be noted that a location at which the first pressure sensor 23 is disposed is not limited to the location shown in FIG. 2. The first pressure sensor 23 may be disposed at different locations based on different application scenarios, provided that the first pressure sensor 23 can accurately detect the pressure value applied by the driver to the accelerator pedal 22.

Figure 3:
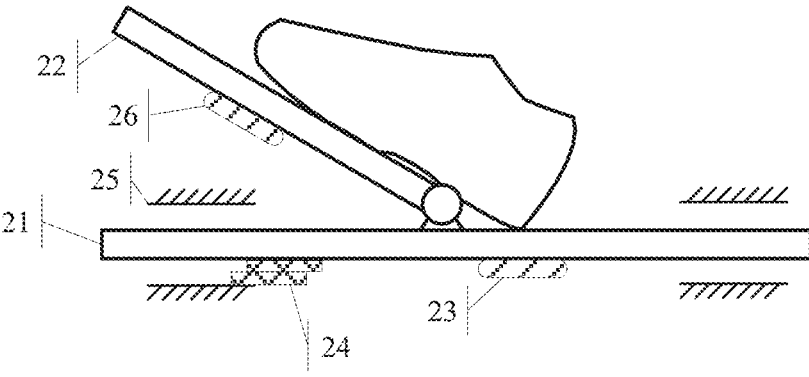
FIG. 3 is a second schematic diagram of a structure of a vehicle control apparatus according to an embodiment of this application.

In a possible embodiment, as shown in FIG. 3, the vehicle control apparatus further includes a second pressure sensor 26. The second pressure sensor 26 is disposed on the accelerator pedal 22. Specifically, the second pressure sensor 26 is disposed on a non-pedaled surface of the accelerator pedal 22. A surface that is of the accelerator pedal 22 and that is in contact with a foot of the driver is a pedaled surface, and a surface that is not in contact with a foot of the driver is the non-pedaled surface. The pressure value applied to the accelerator pedal 22 may be detected by using the second pressure sensor 26. Whether an acceleration signal is valid may be determined based on the pressure value.

Figure 4:
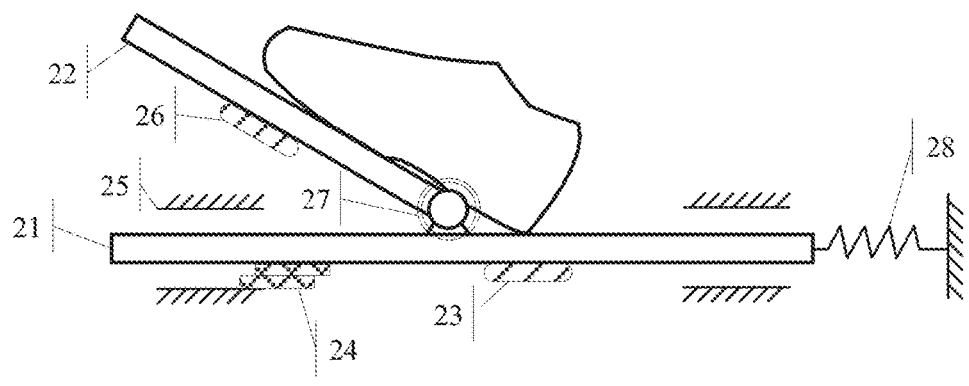
FIG. 4 is a third schematic diagram of a structure of a vehicle control apparatus according to an embodiment of this application.

In a possible embodiment, as shown in FIG. 4, the vehicle control apparatus further includes a first elastic component 27 and a second elastic component 28. One end of the first elastic component 27 is fastened to the vehicle chassis 25, and the other end is fastened to a first end of the brake pedal 21. After the brake pedal 21 moves, the moved brake pedal 21 may be reset by using the first elastic component 27. The first elastic component 27 may be a spring or another component having a rebound function.

The second elastic component 28 is disposed on the revolute pair. After the accelerator pedal 22 rotates, the second elastic component 28 is compressed. When pressure applied by the driver to the accelerator pedal 22 decreases, the accelerator pedal 22 may be reset by using the second elastic component 28.

Figure 5A:
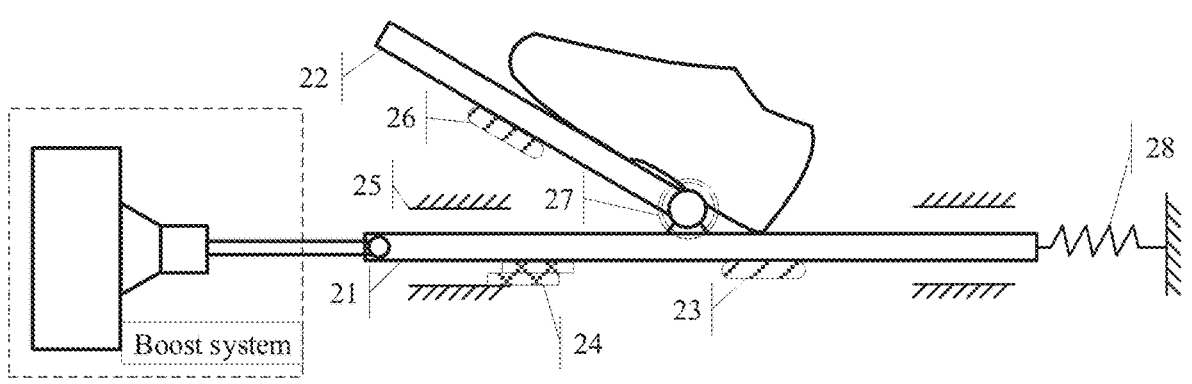
FIG. 5a is a first schematic diagram of a structure of a connection between a vehicle control apparatus and a boost system according to an embodiment of this application.
Figure 5B:
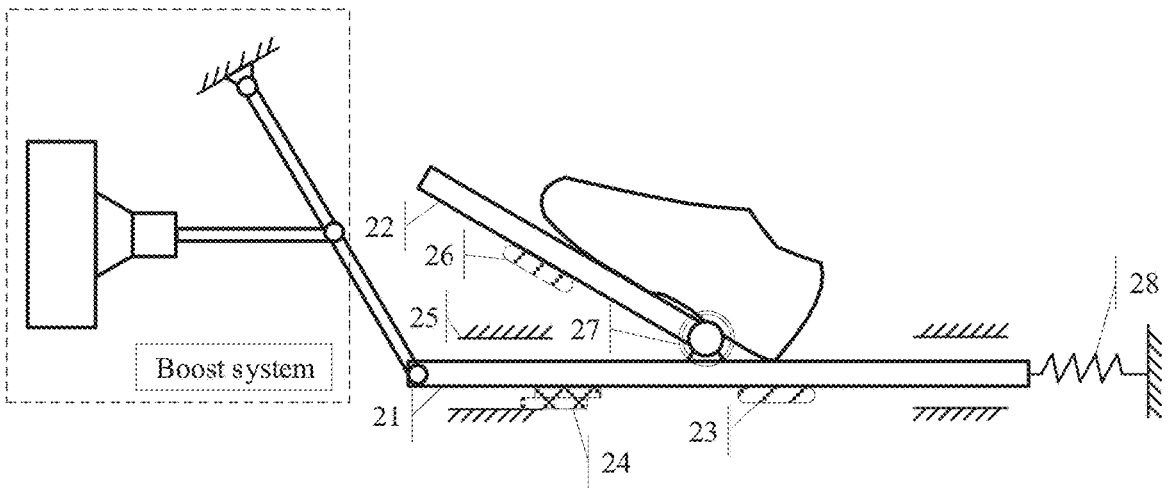
FIG. 5b is a second schematic diagram of a structure of a connection between a vehicle control apparatus and a boost system according to an embodiment of this application.

In a possible embodiment, as shown in FIG. 5*a* and FIG. 5*b*, a second end of the brake pedal 21 of the vehicle control apparatus is connected to a boost system. The connection manner is a fixed connection manner, for example, a riveting or clamping manner. The boost system provides a mechanical boost for movement of the brake pedal 21, so that control on the brake pedal 21 is more convenient.

Embodiment 2

Figure 6:
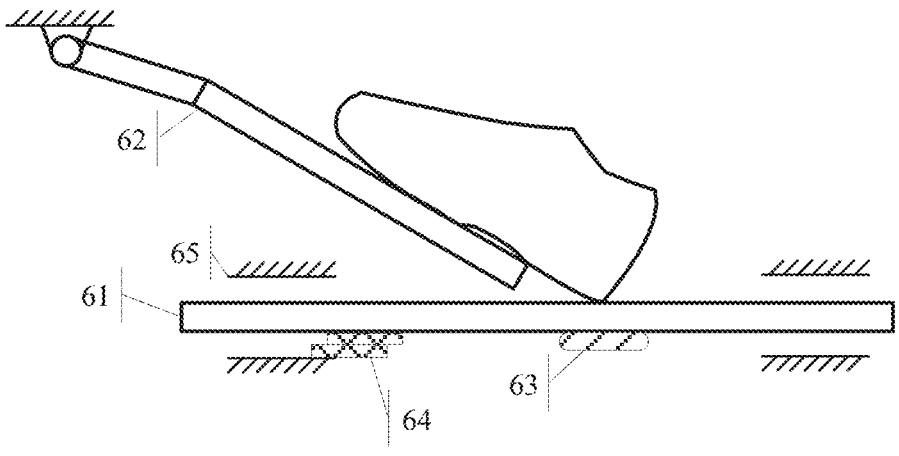
FIG. 6 is a fourth schematic diagram of a structure of a vehicle control apparatus according to an embodiment of this application.

FIG. 6 is a schematic diagram of a structure of a control apparatus further according to an embodiment of this application. The apparatus includes a brake pedal 61, an accelerator pedal 62, a first pressure sensor 63, and a first displacement sensor 64. The brake pedal 61 is connected to a vehicle chassis 65 by using a kinematic pair, and at least a part of the accelerator pedal 62 is projected on the brake pedal 61.

As shown in FIG. 6, a second end of the accelerator pedal 62 is connected to the vehicle chassis 65 by using a revolute pair, so that the accelerator pedal 62 adjusts an opening degree value by using the revolute pair. A first end of the accelerator pedal 62 is disposed in a suspended manner, and a vertical distance between the first end of the accelerator pedal 62 and the brake pedal 61 is less than a vertical distance between the second end of the accelerator pedal 62 and the brake pedal 61. In other words, the first end of the accelerator pedal 62 is an end close to the brake pedal 61, and the second end of the accelerator pedal 62 is an end away from the brake pedal 61.

In this embodiment of this application, the brake pedal 61 is located between the accelerator pedal 62 and the vehicle chassis 65, and a part of the accelerator pedal 62 is vertically projected on the brake pedal 61. Briefly, the accelerator pedal 62 is located above the brake pedal 61. Through the foregoing structure, a driver may simultaneously put a same foot on the accelerator pedal and the brake pedal, so that the foregoing structure can ensure that the driver controls switching between acceleration and braking without moving the foot.

It should be noted herein that in this embodiment of this application, in addition to a chassis below a location of the foot of the driver, the vehicle chassis further includes a region below a steering wheel of a vehicle. In FIG. 6, the vehicle chassis connected to the accelerator pedal 62 is the region below the steering wheel of the vehicle.

In this embodiment of this application, the brake pedal 61 is disposed below the accelerator pedal 62. When the driver controls the accelerator pedal 62, the brake pedal 61 is under the foot of the driver. Therefore, the driver may control the brake pedal 61 and the accelerator pedal 62 by using the same foot. Therefore, the driver does not need to move the foot when switching from acceleration control to braking control of the vehicle. This reduces reaction time of the driver, greatly reduces an actual braking distance of the vehicle, and reduces a safety risk in an emergency.

In addition, in this embodiment of this application, if vertical projection of the accelerator pedal 62 is completely located on the brake pedal 61, the brake pedal 61 is located right below the accelerator pedal 62; or if the vertical projection of the accelerator pedal 62 is partially located on the brake pedal 61, the brake pedal 61 is located diagonally below the accelerator pedal 62. Herein, a relative location relationship between the brake pedal 61 and the accelerator pedal 62 is described merely by using the vertical projection of the accelerator pedal 62, and an absolute location relationship between the two is not limited. In different actual scenarios, the relative location may be adjusted.

It should be noted herein that because the brake pedal 61 is connected to the vehicle chassis 65 by using the kinematic pair, the brake pedal 61 may move relative to the vehicle chassis 65, and corresponding braking force is determined through detection on a displacement value of the brake pedal 61. Therefore, the first displacement sensor 64 is disposed on the brake pedal 61, and the first displacement sensor 64 is disposed on a non-pedaled surface of the brake pedal 61. As shown in FIG. 6, a surface that is of the brake pedal 61 and that is in contact with a foot of the driver is a pedaled surface, and a surface that is not in contact with a foot of the driver is the non-pedaled surface.

In a possible embodiment, the first displacement sensor 64 is divided into a first part and a second part. The first part is fastened to the vehicle chassis 65, and the second part is fastened to the brake pedal 61. When the brake pedal moves, the second part of the first displacement sensor 64 moves relative to the first part, and the displacement value of the brake pedal 61 is detected through relative movement between the first part and the second part.

When a vehicle needs to be braked, the driver may control the brake pedal 61 to move to brake the vehicle. Specifically, as shown in FIG. 6, if the driver pushes the brake pedal 61 in a horizontal direction in FIG. 6, the brake pedal 61 moves in the horizontal direction. The displacement value of the brake pedal 61 is detected by using the first displacement sensor 64. Because a mapping relationship exists between the displacement value of the brake pedal 61 and the braking force, after the displacement value is detected by using the first displacement sensor 64, the braking force corresponding to the displacement value may be determined based on the mapping relationship, so that braking of the vehicle is controlled based on the braking force. Through the structure shown in FIG. 6, the driver may simultaneously control the brake pedal 61 and the accelerator pedal 62 by using a same foot. Therefore, the driver controls switching between acceleration and braking without moving the foot.

Further, in a possible embodiment, to accurately respond to a braking operation performed by the driver on the vehicle, whether the driver has a braking requirement needs to be determined through pressure detection. Specifically, a pressure value may be detected by using the first pressure sensor 63 disposed on the brake pedal 61, and a pressure threshold is set in a controller. If it is detected that the pressure value is greater than the pressure threshold, it is determined that a braking signal is valid. That is, when it is detected that the pressure value is greater than the pressure threshold, braking is implemented based on the braking force corresponding to the displacement value.

It should be noted that a location at which the first pressure sensor 63 is disposed is not limited to the location shown in FIG. 6. The first pressure sensor 63 may be disposed at different locations based on different application scenarios, provided that the first pressure sensor 63 can accurately detect the pressure value applied by the foot of the driver to the brake pedal 61.

Figure 7:
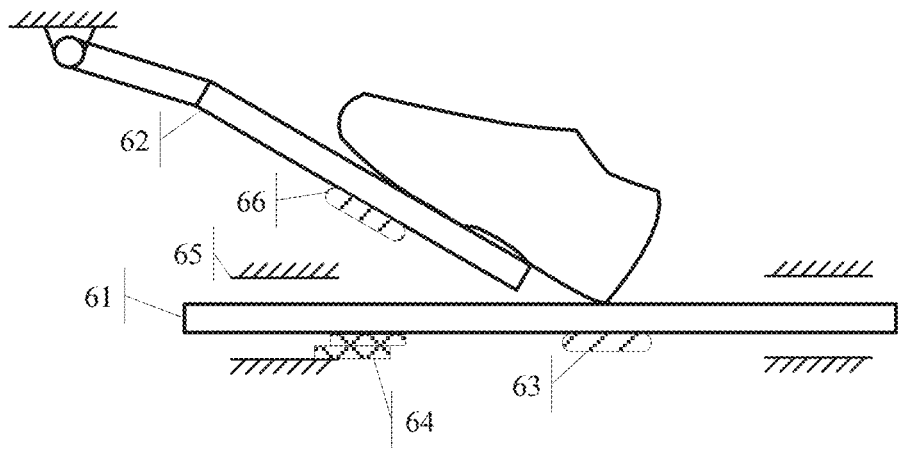
FIG. 7 is a fifth schematic diagram of a structure of a vehicle control apparatus according to an embodiment of this application.

In a possible embodiment, as shown in FIG. 7, the vehicle control apparatus further includes a second pressure sensor 66. The second pressure sensor 66 is disposed on the accelerator pedal 62. Specifically, the second pressure sensor 66 is disposed on a non-pedaled surface of the accelerator pedal 62. A surface that is of the accelerator pedal 62 and that is in contact with a foot of the driver is a pedaled surface, and a surface that is not in contact with a foot of the driver is the non-pedaled surface. The pressure value applied to the accelerator pedal 62 may be detected by using the second pressure sensor 66. Whether an acceleration signal is valid may be determined based on the pressure value.

Figure 8:
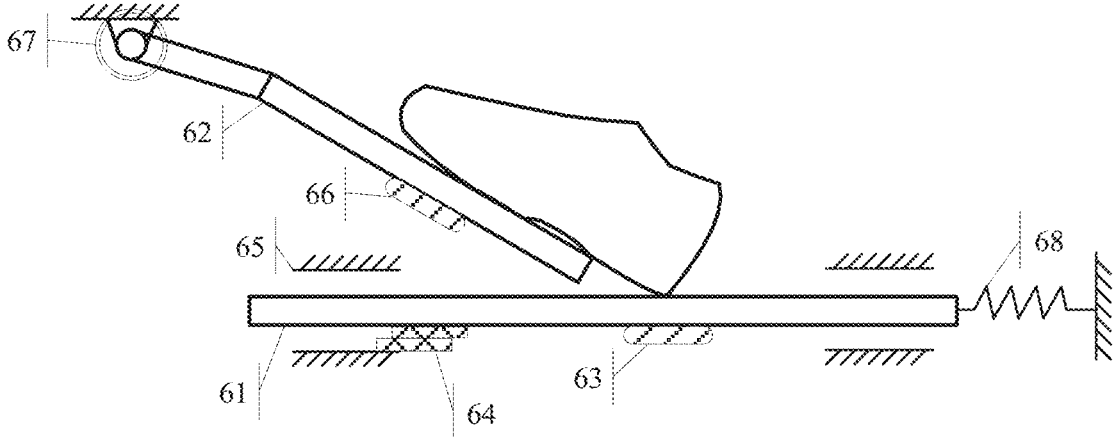
FIG. 8 is a sixth schematic diagram of a structure of a vehicle control apparatus according to an embodiment of this application.

In a possible embodiment, as shown in FIG. 8, the vehicle control apparatus further includes a first elastic component 67 and a second elastic component 68. One end of the first elastic component 67 is fastened to the vehicle chassis 65, and the other end is fastened to a first end of the brake pedal 61. After the brake pedal 61 moves, the moved brake pedal 61 may be reset by using the first elastic component 67. The second elastic component 68 is disposed on the revolute pair, so that the accelerator pedal 62 may be reset by using the second elastic component 68. The first elastic component 67 may be a spring or another component having a rebound function.

Figure 9A:
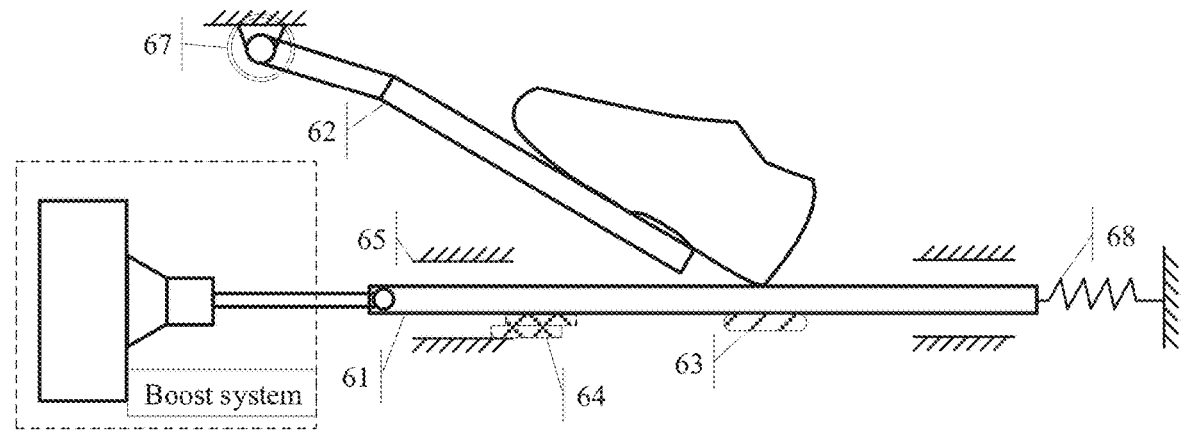
FIG. 9a is a third schematic diagram of a structure of a connection between a vehicle control apparatus and a boost system according to an embodiment of this application.
Figure 9B:
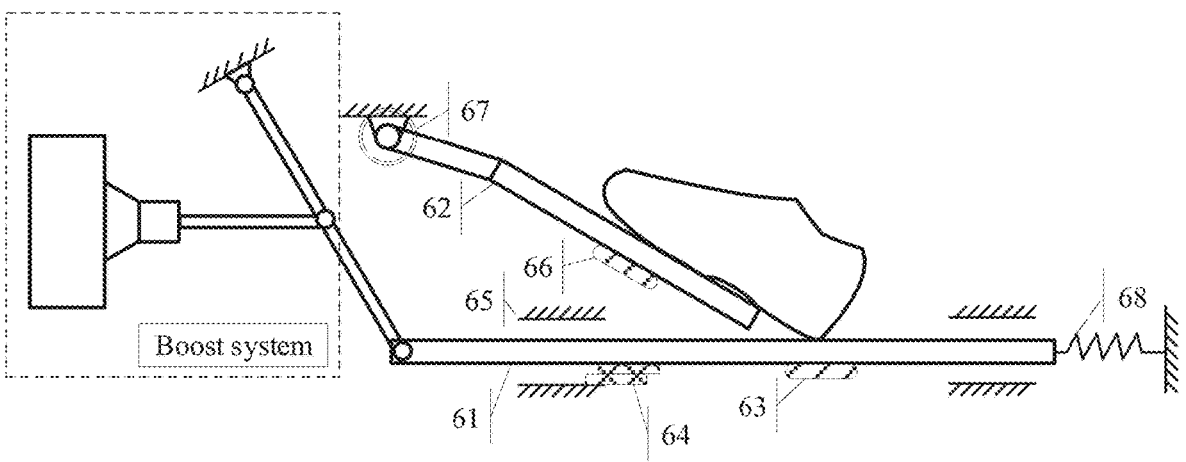
FIG. 9b is a fourth schematic diagram of a structure of a connection between a vehicle control apparatus and a boost system according to an embodiment of this application.

In a possible embodiment, as shown in FIG. 9a and FIG. 9b, a second end of the brake pedal 61 of the vehicle control apparatus is connected to a boost system. The connection manner is a fixed connection manner, for example, a riveting or clamping manner. The main system provides a mechanical boost for movement of the brake pedal 61, so that control on the brake pedal 61 is more convenient.

Embodiment 3

Figure 10:
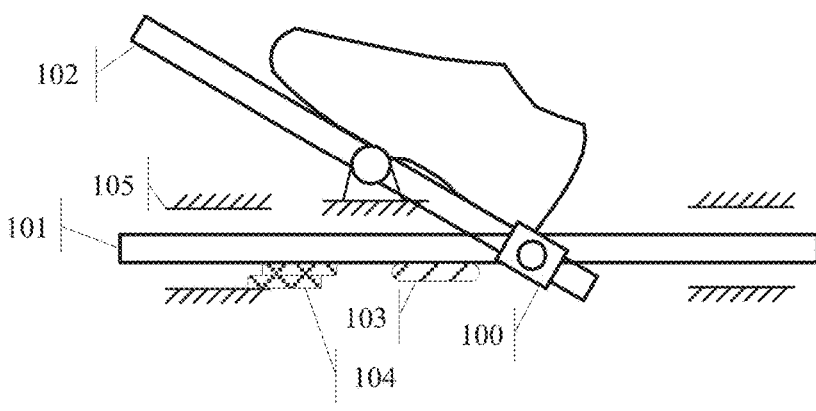
FIG. 10 is a seventh schematic diagram of a structure of a vehicle control apparatus according to an embodiment of this application.

FIG. 10 is a schematic diagram of a structure of a control apparatus further according to an embodiment of this application. The apparatus includes a brake pedal 101, an accelerator pedal 102, a first pressure sensor 103, and a first displacement sensor 104. The brake pedal 101 is connected to a vehicle chassis 105 by using a kinematic pair, and at least a part of the accelerator pedal 102 is projected on the brake pedal 101.

In this embodiment of this application, the brake pedal 101 is located between the accelerator pedal 102 and the vehicle chassis 105, and a part of the accelerator pedal 102 is vertically projected on the brake pedal 101. Briefly, the accelerator pedal 102 is located above the brake pedal 101. Through the foregoing structure, a driver may simultaneously put a same foot on the accelerator pedal and the brake pedal, so that the foregoing structure can ensure that the driver controls switching between acceleration and braking without moving the foot.

In addition, in this embodiment of this application, if vertical projection of the accelerator pedal 102 is completely located on the brake pedal 101, the brake pedal 101 is located right below the accelerator pedal 102; or if the vertical projection of the accelerator pedal 102 is partially located on the brake pedal 101, the brake pedal 101 is located diagonally below the accelerator pedal 102. Herein, a relative location relationship between the brake pedal 101 and the accelerator pedal 102 is described merely by using the vertical projection of the accelerator pedal 102, and an absolute location relationship between the two is not limited. In different actual scenarios, the relative location may be adjusted.

As shown in FIG. 10, a first end of the accelerator pedal 102 is connected to the vehicle chassis 105 by using a revolute pair, a second end of the accelerator pedal 102 is disposed in a suspended manner, one end of the revolute pair is fastened to a first location of the accelerator pedal 102, and the other end of the revolute pair is fastened to the vehicle chassis 105, so that the accelerator pedal 102 adjusts an opening degree value by using the revolute pair. The accelerator pedal 102 is connected to the brake pedal 101 by using a sliding block 100. The sliding block 100 is sleeved at a second location of the accelerator pedal 102, and is hinged to the brake pedal 101.

It should be noted herein that a vertical distance between the first end of the accelerator pedal 102 and the brake pedal 101 is less than a vertical distance between the second end of the accelerator pedal 102 and the brake pedal 101. In other words, the first end of the accelerator pedal 102 is an end close to the brake pedal 101, and the second end of the accelerator pedal 102 is an end away from the brake pedal 101.

Through the foregoing structure, when the driver controls the vehicle to accelerate, the driver may hit the accelerator pedal 102 clockwise, and the accelerator pedal 102 drives, by using the sliding block 100, the brake pedal 101 to move to the left. When the driver controls the vehicle to brake, the driver may pedal the brake pedal 101 in a horizontal direction shown in FIG. 10, and the brake pedal 101 moves in the horizontal direction, and drives, by using the sliding block 100, the accelerator pedal 102 to rotate anticlockwise, or the driver hits the accelerator pedal 102 anticlockwise, and the accelerator pedal 102 drives, by using the sliding block 100, the brake pedal to move in the horizontal direction. Therefore, the structure enables a braking operation to be more simple and convenient. This facilitates an operation of the driver.

It should be noted herein that because the brake pedal 101 is connected to the vehicle chassis 105 by using the kinematic pair, the brake pedal 101 may move relative to the vehicle chassis 105, and corresponding braking force is determined through detection on a displacement value of the brake pedal 101. Therefore, the first displacement sensor 104 is disposed on the brake pedal 101, and the displacement value of the brake pedal 101 is detected by using the first displacement sensor 104, and then the braking force is determined based on the displacement value. When a vehicle needs to be braked, the driver may control the brake pedal 101 to move to brake the vehicle.

Further, in this embodiment of this application, to accurately detect movement of the brake pedal 101, the first displacement sensor 104 is disposed on the brake pedal 101. The displacement value of the brake pedal 101 is detected by using the first displacement sensor 104, and the braking force is determined based on the displacement value.

As shown in FIG. 10, the first displacement sensor 104 is disposed on a non-pedaled surface of the brake pedal 101. A surface that is of the brake pedal 101 and that is in contact with a foot of the driver is a pedaled surface, and a surface that is not in contact with a foot of the driver is the non-pedaled surface. The first displacement sensor 104 may be disposed at any location, and is unnecessarily disposed at a location shown in FIG. 10.

In addition, the first displacement sensor 104 is divided into a first part and a second part. The first part is fastened to the vehicle chassis 105, and the second part is fastened to the brake pedal 101. When the brake pedal moves, the second part of the first displacement sensor 104 moves relative to the first part, and the displacement value of the brake pedal 101 is detected through relative movement between the first part and the second part.

Specifically, as shown in FIG. 10, if the driver pushes the brake pedal 101 to the left in the horizontal direction in FIG. 10, the brake pedal 101 moves to the left in the horizontal direction. The displacement value of the brake pedal 101 is detected by using the first displacement sensor 104. Because a mapping relationship exists between the displacement value of the brake pedal 101 and the braking force, after the displacement value is detected by using the first displacement sensor 104, the braking force corresponding to the detected displacement value may be determined based on the mapping relationship, so that braking of the vehicle is controlled based on the braking force.

Further, in a possible embodiment, to accurately brake the vehicle, whether braking is performed needs to be determined through pressure detection. Specifically, pressure value may be detected by using the first pressure sensor 103 disposed on the brake pedal 101, and a pressure threshold is set in a controller. If it is detected that the pressure value is greater than the pressure threshold, it is determined that a braking signal is valid. That is, when it is detected that the pressure value is greater than the pressure threshold, braking is implemented based on the braking force corresponding to the displacement value.

It should be noted that a location at which the first pressure sensor 103 is disposed is not limited to the location shown in FIG. 10. The first pressure sensor 103 may be disposed at different locations based on different application scenarios, provided that the first pressure sensor 103 can accurately detect the pressure value applied by the foot of the driver to the brake pedal 101.

Figure 11:
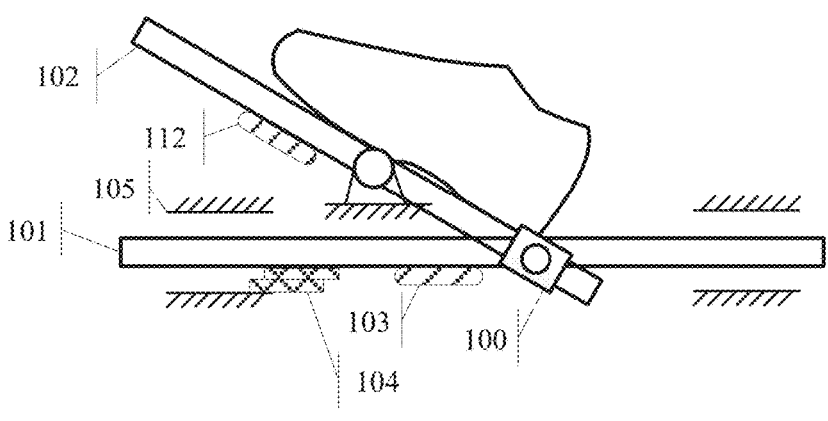
FIG. 11 is an eighth schematic diagram of a structure of a vehicle control apparatus according to an embodiment of this application.

In a possible embodiment, as shown in FIG. 11, the vehicle control apparatus further includes a second pressure sensor 112. The second pressure sensor 112 is disposed on the accelerator pedal 102. Specifically, the second pressure sensor 112 is disposed on a non-pedaled surface of the accelerator pedal 102. A surface that is of the accelerator pedal 102 and that is in contact with a foot of the driver is a pedaled surface, and a surface that is not in contact with a foot of the driver is the non-pedaled surface. The pressure value applied to the accelerator pedal 102 may be detected by using the second pressure sensor 112. Whether an acceleration signal is valid may be determined based on the pressure value.

Figure 12:
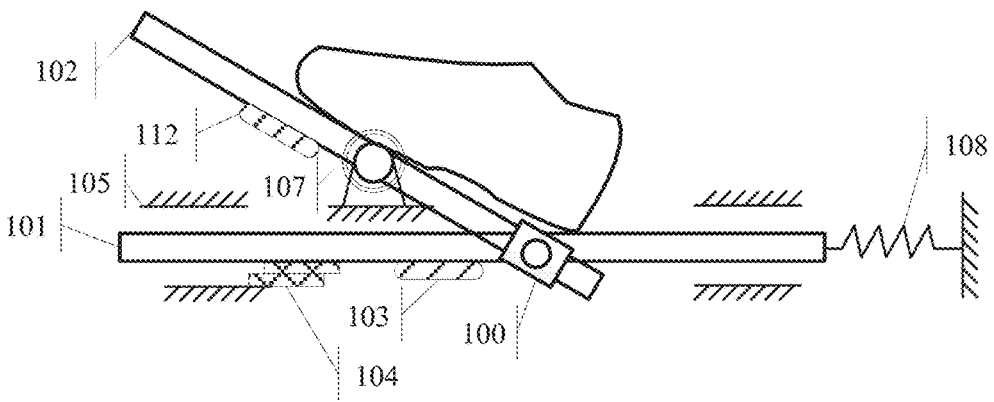
FIG. 12 is a ninth schematic diagram of a structure of a vehicle control apparatus according to an embodiment of this application.

In a possible embodiment, as shown in FIG. 12, the vehicle control apparatus further includes a first elastic component 107 and a second elastic component 108. One end of the first elastic component 107 is fastened to the vehicle chassis 105, and the other end is fastened to a first end of the brake pedal 101. After the brake pedal 101 moves, the moved brake pedal 101 may be reset by using the first elastic component 107. The first elastic component 107 may be a spring or another component having a rebound function.

The second elastic component 108 is disposed on the revolute pair, so that the accelerator pedal 102 may be reset by using the second elastic component 108. The second elastic group 108 may be a component having a rebound function, such as a spring.

Figure 13A:
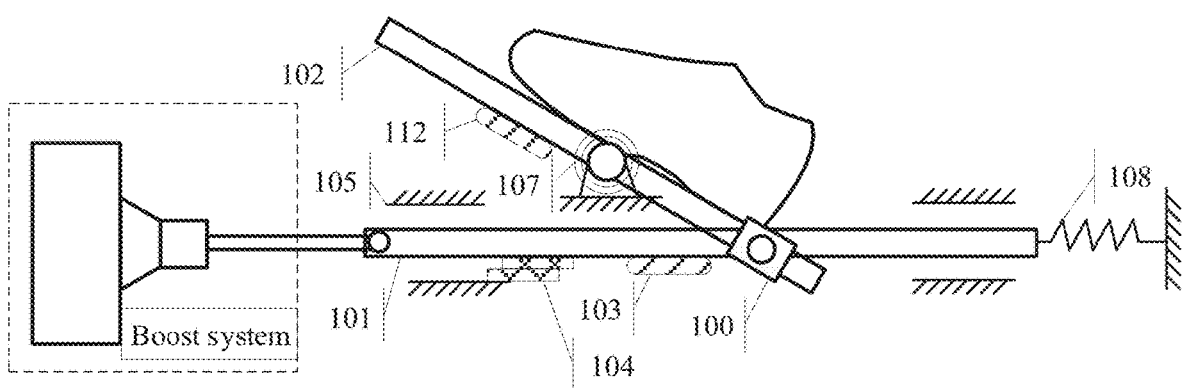
FIG. 13a is a fifth schematic diagram of a structure of a connection between a vehicle control apparatus and a boost system according to an embodiment of this application.
Figure 13B:
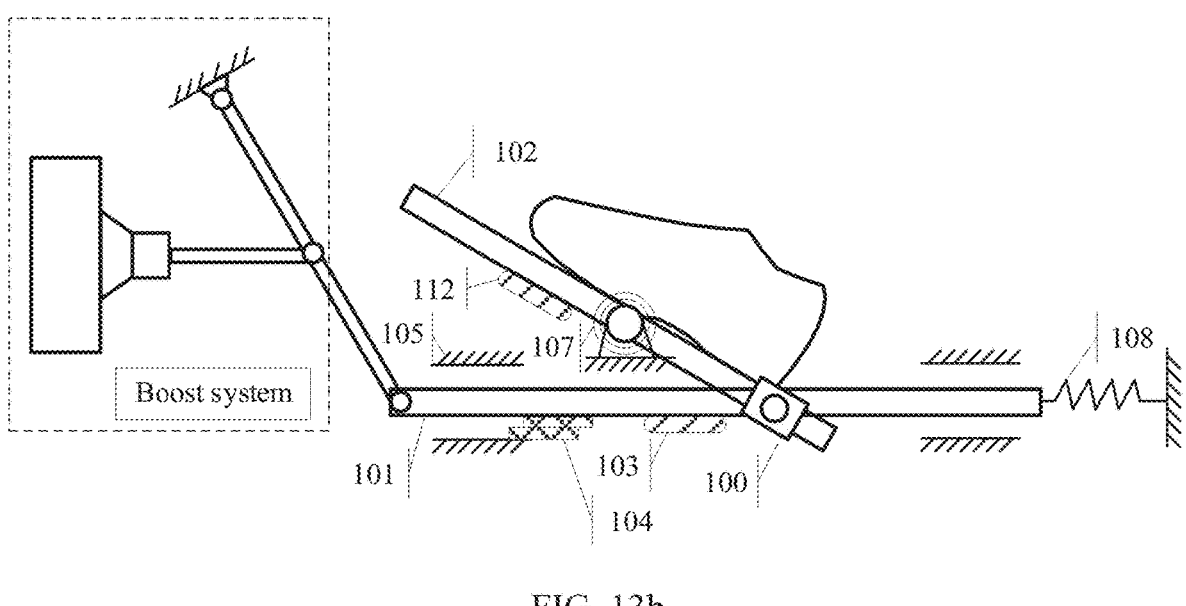
FIG. 13b is a sixth schematic diagram of a structure of a connection between a vehicle control apparatus and a boost system according to an embodiment of this application.

In a possible embodiment, as shown in FIG. 13a and FIG. 13b, a second end of the brake pedal 101 of the vehicle control apparatus is connected to a boost system. The connection manner is a fixed connection manner, for example, a riveting or clamping manner. The main system provides a mechanical boost for movement of the brake pedal 101, so that control on the brake pedal 101 is more convenient.

Embodiment 4

Figure 14:
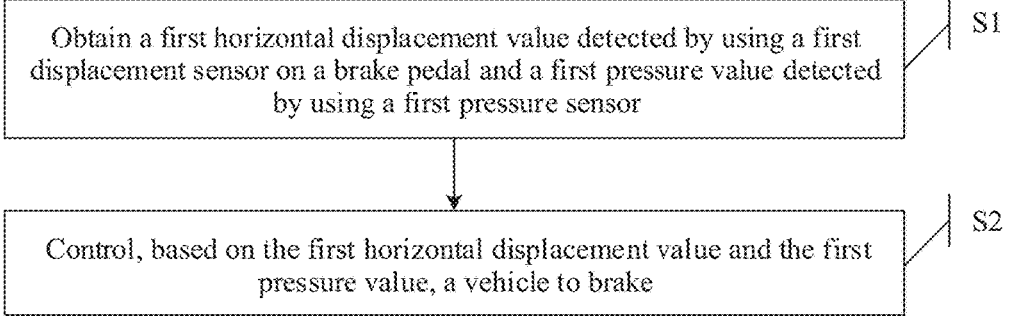
FIG. 14 is a flowchart of a vehicle control method according to an embodiment of this application.

An embodiment of this application further provides a vehicle control method. The vehicle control method may be applied to any vehicle control apparatus in embodiment 1 to embodiment 3. FIG. 14 is a flowchart of the vehicle control method according to this embodiment of this application. The method includes the following steps.

S1: Obtain a first horizontal displacement value detected by using a first displacement sensor on a brake pedal and a first pressure value detected by using a first pressure sensor.

S2: Control, based on the first horizontal displacement value and the first pressure value, a vehicle to brake.

In the vehicle control apparatus shown in embodiment 1 to embodiment 3, if a driver controls the vehicle to brake, the driver may push a brake pedal to brake the vehicle without moving a foot.

Specifically, when the driver pushes the brake pedal to move, a pressure value $F_2$ on the brake pedal may be detected by using the first pressure sensor disposed on the brake pedal, a displacement value $L_1$ of the brake pedal is detected by using the first displacement sensor disposed on the brake pedal, and whether the pressure value $F_2$ is greater than a first preset pressure value $F_{01}$ is determined, that is, whether braking control of the driver is effective is determined.

If $F_2$ is greater than $F_{01}$, braking force corresponding to the displacement value $L_1$ is determined based on a correspondence between the displacement value and the braking force, and a first braking signal that includes the braking force is generated; or if $F_2$ is less than $F_0$, a current state of the vehicle is maintained.

Based on the method, when the vehicle needs to be braked, the driver may directly control the brake pedal under the foot to move, corresponding braking force is accurately determined based on the displacement value and the pressure value of the brake pedal, and a corresponding braking signal is generated, so that the driver does not need to move the foot when switching from acceleration control to braking control of the vehicle. This greatly reduces a reaction distance of the driver, reduces an actual braking distance of the vehicle, and reduces a safety risk in an emergency.

In addition, if the driver controls the vehicle to accelerate, the driver may pedal an accelerator pedal to implement the acceleration.

Specifically, a second pressure value is detected by using a second pressure sensor disposed on the accelerator pedal, and a second displacement value is detected by using a second displacement sensor on the accelerator pedal. When the second pressure value is within a specified range and the second displacement value is greater than a preset threshold, an acceleration signal is generated and output. Specifically, the second pressure value indicates an acceleration intention of the driver. When the second pressure value is greater than the preset threshold, it indicates that the driver has the acceleration intention. In this case, the second displacement value is obtained, and then an acceleration size is determined based on the second displacement value. Certainly, a relationship between the displacement value and the acceleration size is set in the vehicle control apparatus. Therefore, the acceleration size can be accurately determined based on the mapping relationship and the second displacement value.

Further, in this embodiment of this application, considering a free stroke of the accelerator pedal, a displacement threshold may be set to determine the acceleration intention. That is, when the second displacement sensor detects that the displacement value is greater than a preset displacement value, it is determined that the acceleration intention of the driver is valid. In this manner, the acceleration intention of the driver can be further accurately determined.

In a possible embodiment, after the acceleration signal is generated and output, it is detected whether the pressure value currently detected by the first pressure sensor on the brake pedal is less than a second preset pressure value, and if the currently detected pressure value is less than the second preset pressure value, it is determined that the acceleration signal is invalid; or if the currently detected pressure value is greater than the second preset pressure value, it is determined that the acceleration signal is valid. In other words, if the driver controls the vehicle to accelerate, but no pressure value is detected on the brake pedal, it indicates that the acceleration intention of the driver is abnormal. In this case, it is determined that the acceleration signal is invalid. This improves safety in a driving process of the vehicle.

In a possible embodiment, in a process in which the driver drives the vehicle, when it is detected that a vehicle speed of the vehicle is greater than a specified vehicle speed, whether a second braking signal exists is detected in real time. If the second braking signal exists, the vehicle is controlled, based on the second braking signal, to brake, or if the second braking signal does not exist, the vehicle is controlled, based on the acceleration signal, to accelerate. In other words, in this embodiment of this application, when the speed of the vehicle exceeds the specified speed, braking is performed first, so that braking can be implemented based on the braking signal in a timely manner in the driving process of the vehicle. This improves safety in the driving process of the vehicle.

The following describes, by using two specific application scenarios, the vehicle control method provided in this application.

Scenario 1: Emergency Braking

When the driver controls the vehicle to switch from an acceleration state to a braking state, and intends to brake the vehicle in advance in an emergency, typically, the driver uses a heel as a rotation pivot point, slightly lifts a right foot, releases the accelerator pedal, and drives the brake pedal forward by using the heel as a force application point. In the entire process, the $F_2$ and $F_3$ increase sharply. Typically, a direction of the $F_3$ changes from $-X$ to $X$. Because an opening degree of the accelerator pedal is not used as a basis for determining validity of the brake pedal, even if the driver fails to effectively release an accelerator in an emergency, a system still determines that the braking signal is valid after a brake pedal stroke $L_1$ and the brake pedal force $F_2$ reach thresholds.

Scenario 2: Single-Pedal Mode

Based on the vehicle control apparatus in the foregoing embodiments, in a case in which the acceleration signal is valid, braking may be implemented through electric braking based on the opening degree and a change rate of the accelerator pedal, to implement a single-pedal mode. Compared with a conventional apparatus, in a case of emergency braking, switching from electric braking to hydraulic braking and electro-hydraulic braking is easier to implement.

Based on the method provided in this application and the vehicle control apparatus in the foregoing embodiments, the driver can perform operation switching between the accelerator pedal and the brake pedal without moving horizontally or rotating the right foot, and switching time is shorter. When the acceleration state and the braking state are switched to each other, actions of the driver are more consistent and smooth, and comply with an instinctive action response of a person in an emergency situation. Therefore, a misoperation probability of the driver in an emergency braking scenario can be reduced.

Figure 15:
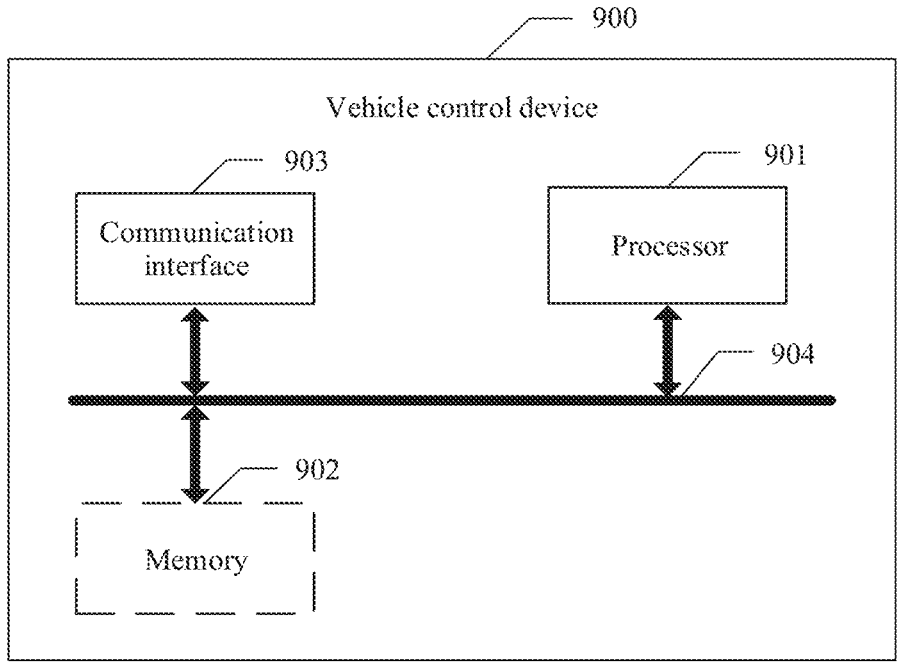
FIG. 15 is a schematic diagram of a structure of a vehicle control device according to an embodiment of this application.

An embodiment of this application further provides a vehicle control device. FIG. 15 shows the vehicle control device 900 provided in this embodiment of this application. The vehicle control device 900 may be the vehicle control apparatus provided in embodiments of this application, and can implement a function of the controller in the method provided in embodiments of this application. The vehicle control device 900 may be a chip system. In this embodiment of this application, the chip system may include a chip, or may include a chip and another discrete device.

In a specific implementation, the vehicle control device 900 includes at least one processor 901, configured to implement or support the vehicle control device 900 in implementing a function of the method provided in embodiments of this application. For details, refer to the detailed descriptions in the method examples. Details are not described herein again.

The vehicle control device 900 may further include at least one memory 902, configured to store program instructions and/or data. The memory 902 is coupled to the processor 901. The coupling in embodiments of this application may be an indirect coupling or a communication connection between apparatuses, units, or modules in an electrical form, a mechanical form, or another form, and is used for information exchange between the apparatuses, the units, or the modules. The processor 901 may collaboratively operate with the memory 902. The processor 901 may execute the program instructions and/or the data stored in the memory 902, so that the vehicle control device implements a corresponding method. At least one of the at least one memory may be included in the processor. It should be noted that the memory 902 is not necessary, and therefore, is illustrated by using a dashed line in FIG. 15.

The vehicle control device 900 may further include a communication interface 903, configured to communicate with another device by using a transmission medium, so that an apparatus used in the vehicle control device 900 may communicate with another device. For example, the another device may be a control panel or a terminal. The processor 901 may send and receive data through the communication interface 903. The communication interface 903 may be specifically a transceiver.

In this embodiment of this application, a specific connection medium between the communication interface 903, the processor 901, and the memory 902 is not limited. In this embodiment of this application, the memory 902, the processor 901, and the communication interface 903 are connected to each other through a bus 904 in FIG. 15. The bus is represented by using a bold line in FIG. 9. A connection manner between other components is merely an example for description, and is not limited thereto. The bus may be classified into an address bus, a data bus, a control bus, and the like. For ease of representation, only one bold line is used to represent the bus in FIG. 15, but this does not indicate that there is only one bus or only one type of bus.

An embodiment of this application further provides a computer program product, including instructions. When the computer program product is run on a computer, the computer is enabled to perform the vehicle control method in the foregoing embodiments.

An embodiment of this application further provides a vehicle. The vehicle may include a controller, a power system, a brake system, an accelerator pedal, and a brake pedal.

The power system and the brake system are configured to: receive a control instruction of the controller, and perform acceleration control or braking control based on the received control instruction.

The controller is configured to perform the vehicle control method provided in the foregoing embodiments.

Optionally, the vehicle may further include a housing, a control panel, and a power supply.

A person skilled in the art should understand that embodiments of this application may be provided as a method, a system, or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions can be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

The computer program instructions may be stored in a computer-readable memory that can instruct the computer or the another programmable data processing device to operate in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the protection scope of this application. This application is intended to cover these modifications and variations of this application provided that they fall within the scope of protection defined by the claims of this application and their equivalent technologies.

What is claimed is:

1. A method for controlling a vehicle, wherein the method comprises:
obtaining a first horizontal displacement value detected by using a first displacement sensor on a brake pedal and a first pressure value detected by using a first pressure sensor; and
controlling, based on the first horizontal displacement value and the first pressure value, the vehicle to brake or accelerate.

2. The method according to claim 1, wherein controlling, based on the first horizontal displacement value and the first pressure value, the vehicle to brake or accelerate comprises:
determining whether the first pressure value is greater than a first preset pressure value; and
in response to determining that the first pressure value is greater than the first preset pressure value, determining a braking force based on the first horizontal displacement value, and generating and outputting a first braking signal that comprises the braking force; or
in response to determining that the first pressure value is not greater than the first preset pressure value, maintaining a current state of the vehicle.

3. The method according to claim 1, wherein the method further comprises:
obtaining a second pressure value detected by using a second pressure sensor on an accelerator pedal and a second displacement value detected by using a second displacement sensor on the accelerator pedal; and
when the second pressure value is within a specified range, and when the second displacement value is greater than a preset threshold, generating and outputting an acceleration signal.

4. The method according to claim 3, wherein after the generating and outputting an acceleration signal, the method further comprises:
detecting whether a pressure value currently detected by the first pressure sensor on the brake pedal is less than a second preset pressure value; and
in response to determining that the pressure value currently detected by the first pressure sensor on the brake pedal is less than the second preset pressure value, determining that the acceleration signal is invalid; or
in response to determining that the pressure value currently detected by the first pressure sensor on the brake pedal is not less than the second preset pressure value, determining that the acceleration signal is valid.

5. The method according to claim 3, wherein after the generating and outputting an acceleration signal, the method further comprises:
when it is detected that a vehicle speed of the vehicle is greater than a specified speed, detecting whether a second braking signal exists; and
in response to determining that the second braking signal exists, controlling, based on the second braking signal, the vehicle to brake; or
in response to determining that the second braking signal does not exist, controlling, based on the acceleration signal, the vehicle to accelerate.

6. A vehicle, comprising a controller, an accelerator pedal, and a brake pedal, wherein:
the controller comprises at least one processor and one or more memories coupled to the at least one processor, wherein the one or more memories store programming instructions for execution by the at least one processor to:
obtain a first horizontal displacement value detected by using a first displacement sensor on the brake pedal and a first pressure value detected by using a first pressure sensor; and
control, based on the first horizontal displacement value and the first pressure value, the vehicle to brake or accelerate.

7. The vehicle according to claim 6, wherein controlling, based on the first horizontal displacement value and the first pressure value, the vehicle to brake or accelerate comprises:
determining whether the first pressure value is greater than a first preset pressure value; and
in response to determining that the first pressure value is greater than the first preset pressure value, determining a braking force based on the first horizontal displacement value, and generating and outputting a first braking signal that comprises the braking force; or
in response to determining that the first pressure value is not greater than the first preset pressure value, maintaining a current state of the vehicle.

8. The vehicle according to claim 6, wherein the one or more memories store programing instructions for execution by the at least one processor to:
obtain a second pressure value detected by using a second pressure sensor on the accelerator pedal and a second displacement value detected by using a second displacement sensor on the accelerator pedal; and
when the second pressure value is within a specified range, and when the second displacement value is greater than a preset threshold, generate and output an acceleration signal.

9. The vehicle according to claim 8, wherein after generating and outputting the acceleration signal, the one or more memories store programing instructions for execution by the at least one processor to:

detect whether a pressure value currently detected by the first pressure sensor on the brake pedal is less than a second preset pressure value; and in response to determining that the pressure value currently detected by the first pressure sensor on the brake pedal is less than the second preset pressure value, determine that the acceleration signal is invalid; or in response to determining that the pressure value currently detected by the first pressure sensor on the brake pedal is not less than the second preset pressure value, determine that the acceleration signal is valid.

10. The vehicle according to claim 8, wherein after generating and outputting the acceleration signal, the one or more memories store programing instructions for execution by the at least one processor to:

when it is detected that a vehicle speed of the vehicle is greater than a specified speed, detect whether a second braking signal exists; and in response to determining that the second braking signal exists, control, based on the second braking signal, the vehicle to brake; or in response to determining that the second braking signal does not exist, control, based on the acceleration signal, the vehicle to accelerate.

* * * * *